United States Patent
Fischer et al.

(10) Patent No.: US 8,244,786 B2
(45) Date of Patent: Aug. 14, 2012

(54) DEVICE AND METHOD FOR GENERATING A RANDOM NUMBER

(75) Inventors: Martin Fischer, Pfedelbach (DE); Ulrich Friedrich, Ellhofen (DE); Kim Kueter, Heilbronn (DE); Jens Masuch, Heilbronn (DE); Michael Pangels, Ludwigsburg (DE); Dirk Ziebertz, Eberstadt (DE)

(73) Assignee: Atmel Corporation, San Jose, CA (US)

( * ) Notice: Subject to any disclaimer, the term of this patent is extended or adjusted under 35 U.S.C. 154(b) by 1055 days.

(21) Appl. No.: 12/125,716

(22) Filed: May 22, 2008

(65) Prior Publication Data

US 2009/0006513 A1    Jan. 1, 2009

Related U.S. Application Data

(60) Provisional application No. 60/939,846, filed on May 23, 2007.

(30) Foreign Application Priority Data

May 22, 2007    (DE) .......................... 10 2007 025 780

(51) Int. Cl.
  *G06F 7/58* (2006.01)
(52) U.S. Cl. ...................................................... 708/254
(58) Field of Classification Search .................. None
  See application file for complete search history.

(56) References Cited

U.S. PATENT DOCUMENTS

| | | | |
|---|---|---|---|
| 5,515,307 A | 5/1996 | Aiello et al. | |
| 6,834,291 B1 * | 12/2004 | Pugh et al. | 708/252 |
| 7,080,107 B2 * | 7/2006 | Pugh et al. | 708/252 |
| 8,019,802 B2 * | 9/2011 | Rose et al. | 708/254 |
| 2002/0156819 A1 | 10/2002 | Oerlemans | |
| 2002/0186086 A1 | 12/2002 | Curiger et al. | |
| 2003/0145216 A1 | 7/2003 | Nakane et al. | |
| 2003/0204541 A1 * | 10/2003 | Shackleford et al. | 708/250 |
| 2005/0055391 A1 | 3/2005 | Carlson | |
| 2006/0104443 A1 | 5/2006 | Chari et al. | |
| 2006/0224647 A1 * | 10/2006 | Gutnik | 708/250 |
| 2008/0270502 A1 * | 10/2008 | Barak et al. | 708/253 |
| 2008/0278325 A1 * | 11/2008 | Zimman et al. | 340/572.1 |
| 2010/0005128 A1 * | 1/2010 | Ergun | 708/251 |

FOREIGN PATENT DOCUMENTS

| | | |
|---|---|---|
| EP | 0 095 272 B1 | 6/1986 |
| EP | 1075084 | 2/2001 |
| WO | WO 99/38069 | 7/1999 |
| WO | WO 01/61854 A1 | 8/2001 |

(Continued)

OTHER PUBLICATIONS

Office Action and English translation for Chinese Patent Application 200880014586, Aug. 2, 2001.

(Continued)

*Primary Examiner* — David H Malzahn
(74) *Attorney, Agent, or Firm* — Baker Botts L.L.P.

(57) ABSTRACT

A method and a device are provided, in particular a transponder, for generating a random number by a linear feedback shift register, wherein a first seed is generated by means of a first automaton, a second seed is generated by means of a second automaton, the first and second automata operate using different functional principles, so that the first and second seeds have different properties, and the shift register is reloaded with the first and/or second seed.

21 Claims, 1 Drawing Sheet

FOREIGN PATENT DOCUMENTS

WO    WO 2007 037869    4/2007

OTHER PUBLICATIONS

Office Action and English translation of Official Communication for German Patent Application 2008 000 057.3, Ref: P74806AK914hsr, Jun. 1, 2012.

Chinese Office Action and English Translation of Text of the Second Office Action, Chinese Patent Application No. 200880014586.X, filed Dec. 19, 2011; Ref. USBBL69359-gy, 080900.1017; 2012042600676160 (16 pgs), May 2, 2012.

* cited by examiner

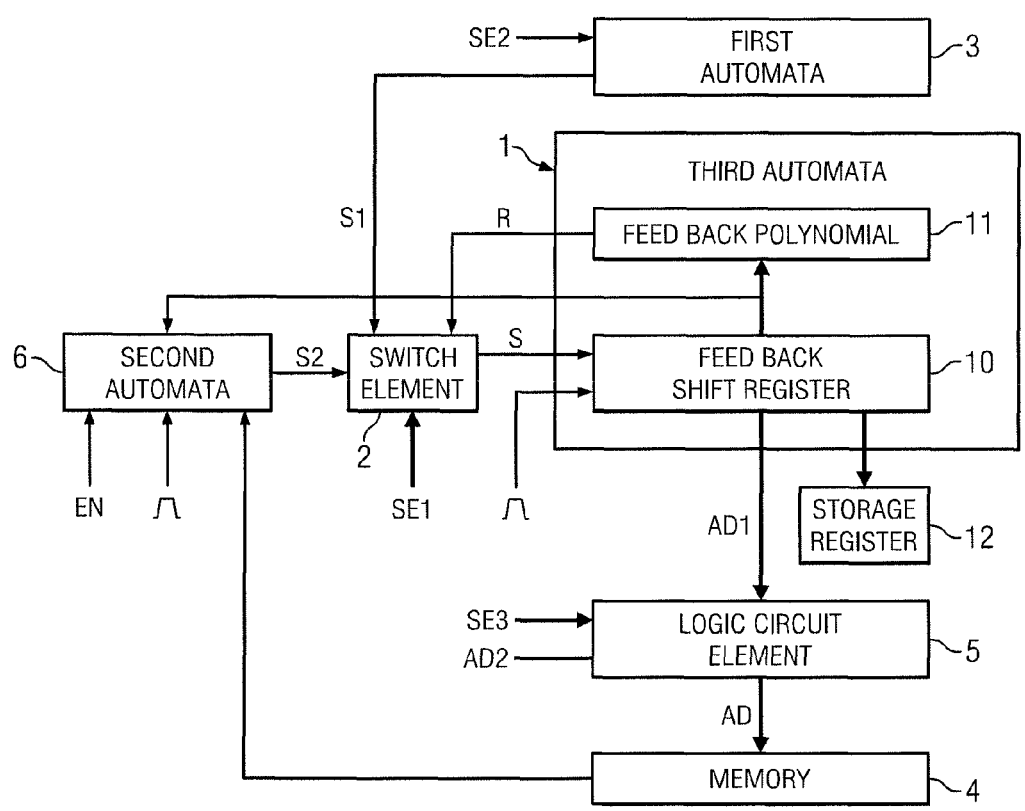

DEVICE AND METHOD FOR GENERATING A RANDOM NUMBER

This nonprovisional application claims priority to German Patent Application No. DE 10 2007 025 780.7, which was filed in Germany on May 22, 2007, and to U.S. Provisional Application No. 60/939,846, which was filed on May 23, 2007, and which are both herein incorporated by reference.

BACKGROUND OF THE INVENTION

1. Field of the Invention

The invention relates to a method and a device for generating a random number by means of a linear feedback shift register, in particular for generating a random number in a transponder.

2. Description of the Background Art

Random numbers are used for encryption, for example. Along with the algorithm used, the length and statistical properties of the random number used are extremely important for the quality of the encryption. Many attacks for decrypting an encrypted text are targeted at random number generation. Thus, certain requirements are placed on random numbers, such as high periodicity, uniform distribution of the random numbers over the value range, uniform distribution of zeroes and ones, the probability of runs of ones or zeroes, and/or low correlation of one random number to a subsequent random number. The methods for generating the random number must typically be disclosed. For this reason, it is also important that different random numbers are produced under identical boundary conditions reproducible by an attacker.

Encryption by means of random numbers has applications in contactless identification systems or what are known as radio frequency identification (RFID) systems, for example. Such systems typically include a base station or a reader unit and a number of transponders or remote sensors that are simultaneously located in the base station's response area. The transponders or their transmitting and receiving devices typically do not have an active transmitter for transmitting data to the base station. Such non-active systems are called passive systems when they do not have their own power supply, and are called semipassive systems when they have their own power supply. Passive transponders take the energy required to supply them from the electromagnetic field emitted by the base station. A variety of standards exist for RFID systems. These include the standards developed by EPCglobal Inc. for uniform use of RFID technologies. For example, according to the EPCglobal class 1, generation 2 protocol, a password with a length of 32 bits must be cracked in order to obtain write access to a memory area of a transponder. Transmission of this password, at least in the forward link, which is to say from a base station to a transponder, is protected by a 16-bitwise XOR encryption of the password with a random number that is provided to the base station by the transponder. The transponder must therefore have means for generating a random number.

Through the use of passive transponders, additional requirements are placed on generation of a random number in a transponder besides a high quality of the random number, for example components that are used must be integratable in the smallest possible area, and power consumption must be minimized. In passive transponders, the power consumption is correlated with the communication distance, whereby the communication distance increases as the power consumption of the transponder decrease. Preferably, it is desired to use existing switching components to reduce the area of the surface.

So-called linear feedback shift registers (LFSR) are known for generating pseudorandom numbers with good uniformity of distribution and minimal autocorrelation. The longer a linear feedback shift register is selected, the longer its periodicity is and the quality of the pseudo random number. However, because of high power consumption and a large area requirement, long linear feedback shift registers are generally impractical for generating random numbers in passive transponders. Moreover, a result of a linear feedback shift register is in principle predictable and thus reproducible because of its synchronous, digital properties, even when a feedback polynomial is changed.

In order to reduce predictability of a shift register, it is also known to use two oscillators with different frequencies. In this context, one oscillator with a slow frequency is used as the clock frequency for the shift register. In addition, a second oscillator with a higher frequency is used as the data input for the shift register. However, one disadvantage of this solution is that the second oscillator with the higher frequency also has a higher power consumption. Moreover, the frequencies must be very closely matched to one another to prevent runs of zeroes or ones at the data input. Such precision is accompanied by a high power consumption, however.

In addition, it is known to store specific random numbers in a memory area of a device, such as a computer, a transponder, or the like; said random numbers can either be read out directly as the random number or can be used as so-called seeds for a shift register. However, these stored random numbers must be protected by appropriate mechanisms to prevent undesired readout by an attacker. Moreover, the memory required to store random numbers generated in such a manner must also be taken into account. Such memory areas are preferably permanent memories such as ROM or EEPROMS. Disadvantageous though is that thereby the memory area and the power consumption is increased, in particular because a high number of random numbers must be stored there.

Known from WO 99/38069 are a method and a device for generating random numbers, wherein a linear feedback shift register is connected to a not entirely ideal physical noise source. To this end, a random data stream is generated by the physical noise source, and this data stream is combined with a second data stream generated by the linear feedback shift register in such a manner that a nearly ideal uniform distribution of ones and zeroes results. An addition method and/or an XOR method are cited as examples of combining methods. Noise sources or noise generators, including the linear feedback shift register.

SUMMARY OF THE INVENTION

It is the object of the present invention to create a method and a device for generating a random number.

This object is attained by a method for generating a random number, wherein a first seed is generated by means of a first automaton, a second seed is generated by means of a second automaton, wherein the first and second automata operate using different statistical functional principles, so that the first and second seeds have different properties, and a third automata includes a shift register that is reloaded with the first and/or second seed and from which the third automata provides the random number.

The basic idea of the invention is thus to use three automata, whereby the third and central automata form the feedback shift register, by which two different mechanisms are preloaded with the first and/or the second seed. The first and the second seed are a first or second random number, that each, depending on the constraints in the individual automata have a smaller quality in comparison to random number provided by the third automata. Accordingly, the quality of the random number provided by the third automata is based on the quality of the first and/or the second random number. The central automaton is a feedback shift register that is preloaded by two different mechanisms. By preloading the shift register with alternating values, different (pseudo) random numbers are generated. The quality of a random number generated by a shift register or third automata is strongly dependent on a quality of a seed, and thus via the inventive method, the quality of the random number of the shift register or the third automata is greatly improved, without having to use a long shift register with a small time period. By using two automata with different functional principles that provide a seed to the third automata, it is possible to optimally take into account minimal changes in the boundary conditions in order to generate random number streams that are independent from one another. In one embodiment, the shift register is a linear feedback shift register (LFSR). In another embodiment, a nonlinear feedback shift register (NLFSR) is employed. As a result of the use of a linear feedback shift register in place of a simple shift register, the random results in the register are also stored beyond the length of the shift register. This improves the quality of the seed with the number of shift clocks, i.e. with the time duration over which the register is operated.

In one embodiment of the invention, a reloading with the first seed is clocked differently than a reloading with the second seed. In this regard, a reloading with the respective seeds can be optimized as a function of power consumption, for example. Preferably, a reloading with the first and/or second seed takes place with irregular clock frequencies.

In one embodiment of the invention, a physical random number source that includes an analog noise generator is used as the first automaton, by which means a first random number is generated. The physical random number source produces a first random number, wherein any possible difficulties resulting from a slowness of the physical random number source or an inadequately uniform distribution can be "brought under control" by the second automaton and/or the shift register.

In a further development of the invention, at least one feedback value of the shift register is logically combined with the first physical random number in order to generate a seed for the shift register. For example, in one embodiment of the invention a physical random number with N bits is generated, wherein N successive feedback values are logically combined with the N bits of the random number into N successive 1-bit values for the shift register. Because at least one feedback value of the shift register, e.g. the LFSR or NLFSR, is used in reloading the physical random number, one reduces the middle value error, i.e. an inadequately uniform distribution, of the physical random number.

In a further development of the invention, the first random number is generated by an analog noise amplifier. In this regard, it is possible to employ the noise in an already-existing electronic circuit to generate the first random number. The analog noise amplifier can typically be switched off and on, and in addition can be placed into a ready state, a so-called sleep mode. In this context, the analog noise amplifier can be quickly reactivated from the ready state in order to achieve a faster startup as compared to a complete switchoff.

In a further development of the invention, the first random number is generated by an amplifier circuit that amplifies the noise of at least one component, in particular the intrinsic noise of the amplifier circuit. In this regard, the amplifier amplifies an unavoidable noise, for example a thermal noise, a shot noise, and/or a 1/f noise of the components, wherein an effect of predictable, reproducible quantities is reduced. These repeatable quantities are, for example, coupling through supply lines and/or the substrate, or a matching. The signal thus produced has a white power density spectrum over the widest possible frequency range. The analog noise signal is preferably amplified by an amplifier circuit to the point where it can be digitized.

In another embodiment of the invention, the first random number is generated by at least one chaotic oscillator. The chaotic oscillator is preferably programmed such that its frequency varies especially widely and thus can be considered random. In one embodiment of the invention, the chaotic oscillator is based on the Chua oscillator principle, wherein the chaotic behavior is produced by a nonlinear element of the oscillator circuit.

In a further development of the invention, the first random number is generated by means of the chaotic oscillator based on Lotka-Volterra equations. Lotka-Volterra equations or rules describe the chaotic behavior in a predator-prey system. These equations are typically used to estimate the population dynamics and/or food relationships among two or more species of animals and/or plants. A chaotic oscillator is described, for example, in the disclosure Asai, T., Kanazawa, Y., Ikebe, M., and Amemiya, Y., "*A MOS circuit for the Lotka-Volterra chaotic oscillator,*" *Proceedings of the 12th International IEEE Workshop on Nonlinear Dynamics of Electronic Systems*, pp. 71-74, Evora, Portugal (May 9-13, 2004), wherein reference is hereby made to the content of this disclosure in its full scope.

To represent a natural system, the natural increase and decrease of the individual species and the encounters among the individual species are represented though differential equations. For use in a chaotic oscillator, these differential equations are converted into a low-voltage circuit, wherein in one embodiment, MOS transistors are used in their subthreshold regions. A chaotic oscillation generated in such a way is converted by a comparator or the like into a digital stream, which can be considered random.

In a further development of the invention, the second seed is read out of a memory that can be a permanent memory area. In implementing the method in a component or a device such as a computer, a transponder, or the like, it is possible to store special numbers in the component or device, so that no two components or devices with the same seeds exist. Transponder special or specific numbers, in particular an identification that is specific for each transponder, are stored in the permanent memory area. In an embodiment, only a portion of the ID, in particular by long ID numbers, are read via a read command, in particular only a random section of the ID number. To read out, an address pointer to the memory for reading out the second seed is generated from a content stored in the shift register. In this way, the randomness of the register value is exploited for addressing the memory. Thus, different random numbers will be generated even under a possible startup of two otherwise identical devices or components of this nature under identical conditions. By this means, the generated random number can also be advantageously used in an anticollision method for communication in an RFID system, for example.

In a further development of the invention, the second seed is logically combined with the feedback value of the shift register. In this way, a possible blockage of the shift register is prevented in that, for example, in a starting phase, only zeros or ones are proved in the register stages of the shift register.

In another embodiment of the invention, the second seed is randomized by a cellular automaton. In a cellular automaton or cellular automata, the states of the individual cells, i.e. the individual bits that are present, are determined at any point in time according to specific definable rules as a function of the cell states (bit states) in a predefined neighborhood and of the cell's own state at a previous point in time. This makes good randomization of the second seed possible.

In a further development of the invention, the first seed formed by the first automata and the second seed formed by the second automata are logically combined as the input value within the third automata for the shift register. In this way, an input signal is generated independently of the activity of the two automata to generate the seeds.

In a further development of the invention, the shift register is clocked and/or reloaded at a variable frequency. Preferably, a clock frequency is adapted to the relevant power consumption of other circuit components of the relevant device or component, in particular of a transponder.

In a further development of the invention, a feedback polynomial for the shift register is chosen to be variable as a function of an internal quantity. The feedback polynomial can be changed here as a function of, for example, a current register value, a state of the cellular automaton, etc. Changing the feedback polynomial causes a periodicity of the shift register to change.

In one embodiment of the invention, the method for generating a random number is used in a transponder of an RFID system, wherein an initialization of the transponder by a reader unit of the RFID system triggers a generation of the first seed, in particular starts a physical random number source.

In a further development of the invention, a command of the reader unit is received by the transponder, and after reception of the command, in particular after reception of the first command following an initialization, a preloading of the shift register by the first seed is terminated, in particular a combining of the first random number with feedback values of the shift register is terminated and/or the random number generator is turned off. Consequently, the preload time is variable and cannot be influenced by means on the transponder, since the time to the first transmission of a signal depends solely on a reader unit, or on a turn-on time of the HF field. By turning off the analog noise source as soon as a corresponding signal is received, power dissipation can be limited. Once the analog noise source has been turned off, it is possible to operate the shift register without additional seeds or with the second seed.

In a further development of the invention, the shift register is reloaded with the second seed, or parts thereof, upon reception of a command, called message hereinafter, by the transponder. In other words, the shift register is reloaded with the second seed in a "message-synchronous" fashion. Since the point in time when the transponder receives a message is not known in advance, it is impossible to predict, and hence to manipulate, this value, and reloading with the second seed takes place independently of a clock frequency of the shift register. In an advantageous embodiment, a clocking of the shift register is reduced or stopped to save energy during the reception of a message. For example, a clocking can be made dependent on a power requirement of additional communications means.

In a further development of the invention, the shift register is preloaded with transponder-internal initialization data. This makes it possible to individually preload each transponder; for example, a unique transponder identifier, that is the ID number of the transponder, stored on the transponder or a product identifier or the like are possible seeds. The identifier here can be encrypted by forming a CRC or the like, so that no internal information is made available by reading out the shift register.

In a further development of the invention, the second seed is taken from an addressed memory area of an identifier of the transponder. In this context, it is possible in particular that during a first time period following a startup, during which a physical random source does not yet provide adequate quality, the quality is improved by the second seed. The values of the addressed memory range are randomized by the feedback value of the shift register and/or the cellular automaton in a suitable manner, so that blockage of the shift register is prevented.

The object is further attained by a device, in particular a transponder, for generating a random number, which device includes a first automaton by which a first seed can be generated, and a second automaton by which a second seed can be generated, wherein the first and second automata operate with different statistical functional principles, so that the first and second seeds have different properties, and both automatons with a third automata, which includes a shift register that provides a random number are connected such that the shift register can be reloaded with the first and/or second seed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein the FIGURE illustrates a schematic representation of a device for generating a random number.

DETAILED DESCRIPTION

The FIGURE schematically shows a block diagram of an inventive device for generating a random number. The central element of the device is a linear feedback shift register 1, comprised of a shift register 10 and a feedback polynomial 11. The shift register is clocked by means of an oscillator (not shown) or another clock generator. Preferably, the clock frequency is variable here.

The generated random number is stored in a storage register 12 that serves as an output register. The storage register 12 is, for example, a so-called loadable slot counter, such as is required for arbitration on a transponder. In another embodiment, a simple latch arrangement is used as the storage register 12, which is then sampled with a 1-of-n-bit multiplexer, resulting in a serial data stream. In order to limit power dissipation, a shift register for storing the random numbers is omitted in a latch arrangement.

The shift register 10 is preloaded using a seed S. The seed S is determined from the combination of various values, which are explained in detail below, for example data streams combined in a circuit element 2 by means of a multiplexer or an XOR combination. With the help of a first select signal SE1 the multiplexer is switched between the data lines of the switch element 2. Thereby, depending on the position of the multiplexer via the XOR combination, different data lines can be connected.

According to the invention, two seeds S1, S2 and a feedback value R are supplied to the circuit element 2. The seeds S1, S2 are produced by means of the first and second automata that operate using different statistical functional principles.

In the exemplary embodiment shown, a first seed S1 is generated by means of an analog noise amplifier 3. Instead of the analog noise amplifier, it is also possible to use a chaotic oscillator as the physical randomness source 3.

The physical randomness source 3, which is a random generator, provides a random number that is not predictable, and hence not reproducible. However, the quality of this random number depends on various factors and oftentimes cannot satisfy the demands placed on a random number with respect to uniform distribution and the like, in particular during a settling process. According to the invention, the random number generated by the physical random number generator 3 is subjected to post-processing, which is to say is digitally processed through the third automata that includes the feedback shift register 3. The output signal of the physical randomness source 3 is used as the first seed S1 here, and is combined, by means of the logical circuit element 2, with the feedback value of the shift register 1 and/or additional values still to be explained. The generation of the first seed S1 is triggered by means of a second select command SE2, wherein the second select command SE2 is likewise independent of a clock signal of the linear feedback shift register 1.

According to the invention, a second seed S2 is supplied to the logic circuit 2. A previously generated random number is used to generate the second seed S2. To this end, a current value of the shift register 10 is read out and used as an address pointer AD1 to a memory area 4. In the case of generation of a random number on a transponder, the memory area 4 is, for example, a memory area in which are stored transponder-specific, unique data (ID number). This measure achieves the result that even in the case of assumed identical content of the shift register 10 and also otherwise the same boundary conditions in two transponders, different values will be taken from the memory area 4.

In the embodiment shown, the address pointer AD1 in the memory area 4 has associated with it a logic circuit element 5 having an output AD, by which means a 6-bit random number, for example, is switched through from the shift register 10 to the memory area 4, so that an address space of, for example, 64 bits can be randomly sampled. The logic circuit element 5 can be a multiplexer and can switch between the address pointer AD1 and an address pointer AD2 via a selection command SE3. Thereby, in connection with the selection command SE3 the selected address is provided at the output AD of the logic circuit element 5. In another embodiment of the invention, there is no need to interpose a logic circuit element 5, that is the address of the address pointer AD1 is provided at the memory area.

In the embodiment shown, the data read out of the memory area 4 are randomized by means of a cellular automaton 6. A randomization prevents a sequence of zeros or ones by which the linear shift register 1 could be blocked. In the embodiment shown, the randomization is additionally accomplished by means of a signal from the linear feedback shift register 1, through which randomization can be further improved. The cellular automaton 6 can be switched on and/or off as desired by means of an enable signal EN.

The inventive method and the inventive device for generating a random number can be used to particular advantage in a transponder, since they are characterized by a low power requirement and small physical space requirement. The low power requirement is achieved by the means that the linear feedback shift register 1 is clocked with variable frequencies, among other means. In this regard, it is possible, for example, that the operating frequency of the linear feedback shift register 1 switches back and forth between two frequencies at a time when no communication is taking place between the transponder and a base station.

In the example embodiment shown, the second seed S2 that is provided by the second automat is obtained from a memory area of the transponder. In this context, according to the invention, the shift register 10 is reloaded with the second seed S2 at every message (command) sent by a base station to the transponder.

The inventive generation of random numbers also makes it possible for the linear feedback shift register 1 to be clocked only during the message when no other activities on the transponder are required and/or these activities use only a small amount of power. A selection of a clock frequency for the shift register 10 can be performed by a clock counter present on the transponder, can be based on a quantity derived from the last message, or can be fixed on the basis of a state of the linear feedback shift register 1.

In an advantageous embodiment, the linear feedback shift register 1 is only clocked when no other activities are taking place on the transponder, so that the activities of the linear feedback shift register 1 need not enter into a range calculation of a transponder. Other components as well, for example a component not shown in the FIGURE for digitizing the output signal of the analog noise source 3, can also be clocked as required in order to minimize energy demand.

Usually, when a transponder is transmitting, for example by backscattering, a message back to a base station, no switching mechanism for generating a control digit or the like is active on the transponder. Simultaneously, no read is typically performed from the memory area 4 at this time. A power requirement of the communications means for transmitting the message back is relatively low, so that the coupled shift register 1 can be clocked during the backscattering. For power dissipation reasons, a clock resulting from the backscatter frequency can be used as the clock here, for example.

Customarily, during reception of a signal, a lower power is needed for receiving a header section. Since the spacing between the protocols can be very small, it is therefore possible to keep the analog noise amplifier 3 active during reception of a header section of a message. The header section is simultaneously used for clocking by means of the second seed S2, wherein, for example, the transponder reads one bit from the memory area 4 during each header section. Consequently, at this time the seeds S1 and S2 may overlap, for example.

RFID systems may be used for electronic payment transactions, for example. In this context, a transponder is associated with a user's card or the like. It is then possible for an authorized base station to debit certain amounts from the card, or an account of the user linked to the card. It is obvious here that such debiting should only be possible for certain authorized groups of people, who have to transmit, e.g., a password to the transponder in order to debit. If the password is transmitted in unencrypted form, a third party could intercept the password and subsequently use it for debiting. In order to prevent interception, the transponder provides the base station with a key that the base station is supposed to use to encrypt the password prior to a transmission. In the simplest case, a random number serves as the key. The transponder must therefore have means to generate a random number of high quality. High quality random numbers can be generated as a result of the inventive combination of an analog noise source with post-processing, wherein optimum adaptation to a power requirement of the transponder is possible by means of variable clocking.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for generating a random number, the method comprising:
   generating a first seed by a first automaton;
   generating a second seed by a second automaton, the first automaton and the second automaton operate using different statistical functional principles, so that the first and second seeds have different properties; and
   providing the random number by a third automaton that is provided with the first or second seed, the third automaton having a feedback shift register, and
   wherein the second seed is obtained by the second automaton and comprises a previously generated random number that was generated by the third automaton such that the previously generated random number is reloaded to the third automaton for generation of the random number.

2. The method according to claim 1, wherein that the second seed is logically combined at least with the feedback value of the shift register.

3. The method according to claim 1, wherein the second seed is randomized by a cellular automaton.

4. The method according to claim 1, wherein the previously generated random number comprises a stored value that is taken from an addressed memory area a transponder, and wherein the method further comprises reloading the feedback shift register with a second seed every time a command is sent by a base station to the transponder.

5. The method according to claim 1, wherein the random number is generated in a passive transponder.

6. The method according to claim 1, wherein the first seed and the second seed have a smaller quality than the random number provided by the third automaton.

7. The method according to claim 1, wherein the previously generated random number is read out of a memory by the second automaton for the second seed.

8. The method according to claim 7, wherein an address pointer to the memory for reading out the previously generated random number is generated from a content stored in the shift register of the third automaton.

9. The method according to claim 7, wherein the previously generated random number is stored in the memory beyond a length of the feedback shift register.

10. The method according to claim 1, wherein a physical random number source is used as the first automaton, by which a first random number is generated, in order to generate the first seed.

11. The method according to claim 10, wherein the first random number is generated by at least one chaotic oscillator.

12. The method according to claim 10, wherein the physical random number source is an analog noise amplifier.

13. The method according to claim 12, wherein the first random number is generated by an amplifier circuit that amplifies the noise of at least one component, in particular the intrinsic noise of the amplifier circuit.

14. A device for generating a random number, the device comprising:
   a first automaton by which a first seed is generated;
   a second automaton by which a second seed is obtained, the first automaton and the second automaton operating with different statistical functional principles, so that the first and second seeds have different properties; and
   a third automaton having a feedback shift register for providing the random number, the third automaton being operatively connected with the first automaton and the second automaton such that the shift register is reloaded with the first and/or second seed, and
   wherein the second seed is obtained by the second automaton and comprises a previously generated random number that was generated by the third automaton such that the previously generated random number is reloaded to the third automaton for generation of the random number.

15. The device according to claim 14, wherein the first automaton has a physical random source that is formed as an amplifier circuit and that amplifies noise of the amplifier circuit.

16. The device according to claim 14, wherein the second automaton includes a cellular automaton.

17. The device according to claim 14, wherein the device includes circuit components, via which the first seed and the second seed are logically combined with one another as an input value for the shift register.

18. The device according to claim 14, wherein the random number is generated in a passive transponder.

19. The device according to claim 14, wherein the first seed and the second seed have a smaller quality than the random number provided by the third automaton.

20. The device according to claim 14, wherein the second automaton includes a component for reading out the previously generated random number from a memory.

21. The device according to claim 20, wherein the previously generated random number is stored in the memory beyond a length of the feedback shift register.

* * * * *